US010957246B2

(12) United States Patent
Sun

(10) Patent No.: US 10,957,246 B2
(45) Date of Patent: Mar. 23, 2021

(54) DISPLAY SCREEN AND ELECTRONIC DEVICE

(71) Applicant: BEIJING XIAOMI MOBILE SOFTWARE CO., LTD., Beijing (CN)

(72) Inventor: Changyu Sun, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/600,541

(22) Filed: Oct. 13, 2019

(65) Prior Publication Data

US 2020/0135096 A1 Apr. 30, 2020

(30) Foreign Application Priority Data

Oct. 30, 2018 (CN) ......................... 201811276141.0

(51) Int. Cl.
*G09G 3/3208* (2016.01)
*G06F 3/14* (2006.01)

(52) U.S. Cl.
CPC ................................. *G09G 3/3208* (2013.01)

(58) Field of Classification Search
CPC ...... G09G 3/3208; G06F 3/042; G06F 3/0421
See application file for complete search history.

(56) References Cited

U.S. PATENT DOCUMENTS 8,514,190 B2 * 8/2013 Birkler ................ G06F 3/04886 345/173
8,749,529 B2 * 6/2014 Powell .................. G06F 3/0412 345/175
10,325,967 B2 * 6/2019 Zeng ...................... H05B 33/26
10,643,578 B2 * 5/2020 Zhou ........................ G09G 5/30
2011/0096033 A1 * 4/2011 Ko .................... H04M 1/72583 345/175
2013/0106898 A1 * 5/2013 Saint-Loubert-Bie ....................... G06F 1/1684 345/592
2019/0156729 A1 * 5/2019 Zhang ...................... G09G 5/10

FOREIGN PATENT DOCUMENTS

CN 107948419 A 4/2018
EP 2315420 A1 4/2011

OTHER PUBLICATIONS

Extended European Search Report dated Feb. 26, 2020 in EP19205943A.

* cited by examiner

*Primary Examiner* — Sardis F Azongha
(74) *Attorney, Agent, or Firm* — Syncoda LLC; Feng Ma

(57) ABSTRACT

A display screen includes a display module. The display module includes a light emitting layer and a driving layer for driving the light emitting layer to emit light. The sensor module is located beneath the display module or located beneath the light emitting layer in the display module. The sensor module includes a plurality of transmitting units for transmitting a wireless signal, and a receiving unit that is used for receiving a reflected signal obtained from the wireless signal being reflected by a detected object and determining distance information between the sensor module and the detected object according to the received reflected signal.

13 Claims, 3 Drawing Sheets

DISPLAY SCREEN AND ELECTRONIC DEVICE

CROSS-REFERENCE OF RELATED APPLICATION

This application claims priority to Chinese Patent Application No. 201811276141.0 filed on Oct. 30, 2018, the disclosure of which is hereby incorporated by reference in its entirety.

BACKGROUND

At present, full-screen electronic devices are more and more popular among users, and designing the full-screen has become a main research direction.

SUMMARY

This disclosure relates generally to the fields of smart devices, and more specifically to a display screen and an electronic device.

Various embodiments of the present disclosure provide a display screen and an electronic device, which are capable of increasing a screen area proportion of the device.

According to a first aspect of the present disclosure, a display screen is provided, which includes:

a display module that includes a light emitting layer and a driving layer for driving the light emitting layer to emit light; and a sensor module that is located beneath the display module or located beneath the light emitting layer in the display module; wherein the sensor module includes:

a plurality of transmitting units for transmitting a wireless signal; and a receiving unit for receiving a reflected signal obtained from the wireless signal being reflected by a detected object and determining distance information between the sensor module and the detected object according to the received reflected signal.

In some embodiments, the display screen further includes a control unit for controlling the transmitting unit to transmit the wireless signal.

In some embodiments, the control unit is further configured to control the plurality of transmitting units to transmit the wireless signal successively, and a time for each of the transmitting units to transmit the wireless signal is less than a time threshold.

In some embodiments, the time threshold is a minimum duration value that one of the transmitting units continuously transmits the wireless signal to excite the light emitting layer to generate light spots.

In some embodiments, distances between each of the transmitting units and the receiving unit are equal to one another, and strength of the wireless signals transmitted by the transmitting units are identical to one another.

In some embodiments, the plurality of transmitting units are arranged around the receiving unit.

In some embodiments, the display module includes a substrate, the driving layer and the light emitting layer are sequentially superimposed on the substrate, and the sensor module is embedded in the substrate.

In some embodiments, an insulating layer is provided between the driving layer and the light emitting layer, and the sensor module is embedded in the insulating layer.

According to a second aspect of the present disclosure, it is provided with an electronic device, which includes the display screen according to any one of the first aspect, and the display screen is arranged on a first side of the electronic device, and the area of the display screen is equal to the area of the first side.

It should be understood that the above general description and the following detailed description are merely illustrative and explanatory and should not be construed as limiting of the disclosure.

BRIEF DESCRIPTION OF THE DRAWINGS

The accompanying drawings here, which are incorporated in the disclosure and constitute a part of the disclosure, show embodiments of the present disclosure and explain the principles of the present disclosure along with the specification.

DETAILED DESCRIPTION

Figure 1:
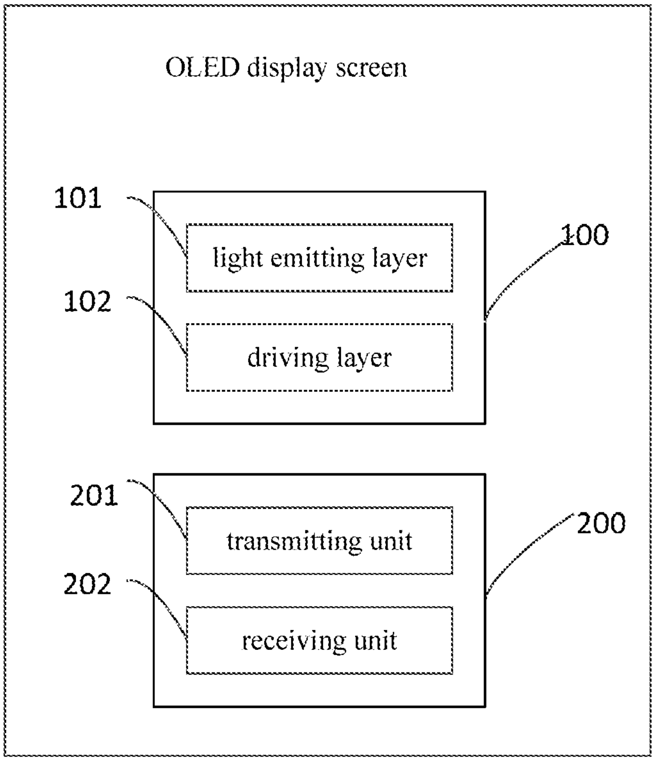
FIG. 1 is a block diagram of a display screen according to an example embodiment.

Various embodiments will be described in detail herein, examples of which are illustrated in the drawings. When the following description refers to the drawings, the same numbers in different drawings represent the same or similar elements, unless otherwise indicated. The embodiments described in the following exemplary embodiments do not represent all embodiments consistent with the present disclosure. Instead, they are merely examples of devices and methods consistent with aspects of the present disclosure as described in detail in the appended claims.

For realization of the full-screen structure of the device, a proportion of the non-display area is reduced gradually, which brings about stacking and design difficulty of components such as a sensor arranged in the non-display area of the device. Under such a trend of increasing proportion of the screen, designing a distance sensor will become more and more difficult.

An embodiment of the present disclosure provides a display screen, which can be arranged on any display device. The display device can include a mobile phone, any computer, a wrist strap, a watch, a television, etc., and any device that is capable to be provided with a display screen can be taken as an embodiment of this disclosure. Beneath a light emitting layer of the display screen of the embodiment of the present disclosure, a sensor module for sensing corresponding information, for example, a distance sensor for detecting a distance, and a radio frequency sensor for sending or receiving radio frequency information and the like, can be arranged so that the sensor does not need to be arranged on the display screen, so as to readily improve the screen proportion of the device and realize the full-screen design.

FIG. 1 is a block diagram of a display screen according to an example embodiment. As shown in FIG. 1, an organic light-emitting diode (OLED) display provided by the embodiment of the present disclosure can include:

a display module 100 that includes a light emitting layer 101 and a driving layer 102 for driving the light emitting layer 101 to emit light; and a sensor module 200 that is located beneath the display module 100 or beneath the light emitting layer 101 of the display module 100;

the sensor module 200 includes:

a plurality of transmitting units 201 for transmitting wireless signals; and a receiving unit 202 that is configured to receive a reflected signal obtained from the wireless signal being reflected by a detected object, and determines a distance information between the sensor module and the detected object according to the received reflected signal.

The various device components, units, blocks, or portions may have modular configurations, or are composed of discrete components, but nonetheless can be referred to as "modules" in general. In other words, the "components," "modules," "blocks," "portions," or "units" referred to herein may or may not be in modular forms.

As shown in FIG. 1, the display screen of the embodiment of the present disclosure can be an OLED display screen or other types of display screens, to which the present disclosure is not limited. The display screen can include a display module 100 that can include a driving layer 102 and a light emitting layer 101. The light emitting layer 101 can be a light emitting element, for example, light emitting diodes on the display screen, and pixel points of the display screen are formed by light emitting diodes arranged in sequence. Alternatively, the light emitting layer 101 can be another light emitting material, for example, an organic material coating layer or the like, to which the embodiment of the present disclosure is not limited. The driving layer 102 can be used to supply current to the light emitting layer to drive the light emitting layer 101 to emit light, wherein the driving layer 102 can include a TFT (thin-film transistor) circuit, through which driving power is supplied to the light emitting layer. Other specific structures of the display screen are not described in detail in the embodiment of the present disclosure, and those skilled in the art can provide the specific structure of the display screen according to the prior art. In addition, the display screen in the embodiment of the present disclosure can include a passive organic light emitting diode display screen (PMOLED) or an active matrix organic light emitting diode display screen (AMOLED).

In order to increase the screen proportion of the display screen in the device or enable the display screen to be configured as a full screen, the sensor module 200 is arranged beneath the light emitting layer 101 of the display screen, such that the sensor module does not need to be arranged on the side of the device on which the display screen is arranged. This can facilitate realizing the full screen design of the display screen, and also can achieve an effect of a beautiful and concise appearance.

Figure 2:
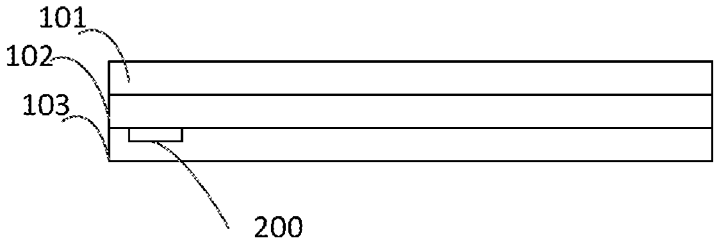
FIG. 2 is a schematic structural view of the display screen according to an example embodiment.

FIG. 2 is a schematic structural view of the display screen according to one example embodiment. And FIG. 3 is another schematic structural view of the display screen according to one example embodiment.

As shown in FIG. 2, the sensor module 200 in the embodiment of the present disclosure can be arranged on a lower side of the driving layer 102 in the display module. For example, the display module 100 on its lowermost layer can further include a substrate 103, which can be made of a glass substrate or other materials, or can be made of other insulating materials. The sensor module 200 can be embedded in the substrate 103. For example, the substrate 103 can include a groove, in which the sensor module 200 can be located, so that there is no need to provide additional space for the sensor module, the size and configuration of the display module may not be affected, and also, the flatness of the display screen can be ensured.

Figure 3:
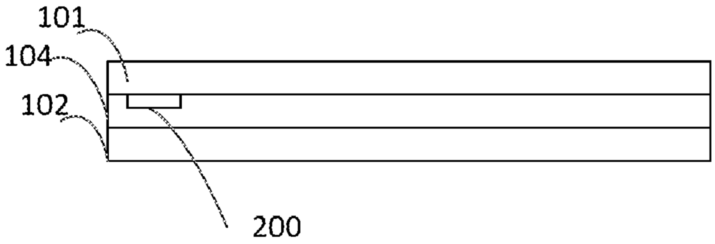
FIG. 3 is another schematic structural view of the display screen according to an example embodiment.

In addition, as shown in FIG. 3, an insulating layer 104 can be further arranged between the light emitting layer 101 and the driving layer 102 of the display screen. The insulating layer 104 can be used for isolation or support, and can ensure a safe connection between the light emitting layer 101 and the driving layer 102 of the display screen. The sensor module 200 can be embedded in the insulating layer 104. For example, the insulating layer 104 can include a groove, in which the sensor module 200 can be located, so that there is no need to provide additional space for the sensor module, the size and configuration of the display module may not be affected, and also, the flatness of the display screen can be ensured.

Alternatively, in the embodiment of the present disclosure, the sensor module 200 can be arranged at other positions under the light emitting layer 101, and the embodiment of the present disclosure is not specifically limited thereto.

The aforesaid configuration can readily increase the proportion of display screen and design a full screen, and can also ensure the flatness of the display screen without changing the size of the display screen.

Hereinafter, the structure of the sensor module 200 according to the embodiment of the present disclosure will be described in detail. The sensor module 200 according to the embodiment of the present disclosure can include a distance sensor, an NFC sensor, and the like, which can be sensors for sensing external information. Under a circumstance of performing the function of the respective sensors, the sensor module 200 of the embodiment of the present disclosure can include:

a plurality of transmitting units 201 for transmitting wireless signals;

a receiving unit 202 for receiving a reflected signal obtained from the wireless signal being reflected by the detected object, and determining distance information between the sensor module and the detected object according to the received reflected signal.

In some embodiments, the transmitting units 201 can be infrared transmitting units for transmitting infrared signals. The receiving unit is an infrared receiving unit. The plurality of transmitting units 201 and the receiving unit 202 can form a distance sensor. The infrared signals emitted by the emitting units 201 are reflected by the detected object (for example, a user), and the receiving unit 102 can receive the reflected signal, so that the distance between the detected object and the sensor module can be determined according to the transmitted signal that has received. A method for calculating the distance is not specifically limited in the implementation of the present disclosure, and can be realized by means of the prior art, for example, the distance information can be determined according to time of receiving the reflected signal and an angle of transmitting the signal, or alternatively, in other possible implementations, the transmitting unit can also be configured to transmit ultrasonic waves or laser signals, and the corresponding receiver can be used to receive the reflected ultrasonic waves or lasers, so as to determine the distance between the detected object and the sensor module.

In another possible implementation, the transmitting unit 201 can be used to transmit a first radio frequency signal, which can be loaded with a first identification information, for example, an identification code of the device, etc. The corresponding receiving unit 202 can be used to receive a second radio frequency signal transmitted by other devices, which can also be loaded with a second identification information of the other devices, for example, a corresponding identification code. After the receiving unit receives the second radio frequency signal, the sensor module can realize the identification of the device, thus enabling the device to perform further operation, such as a network sharing, and security verification, etc. In addition, the transmitting unit transmits the first radio frequency signal to enable other electronic devices to identify the device.

Figure 4:
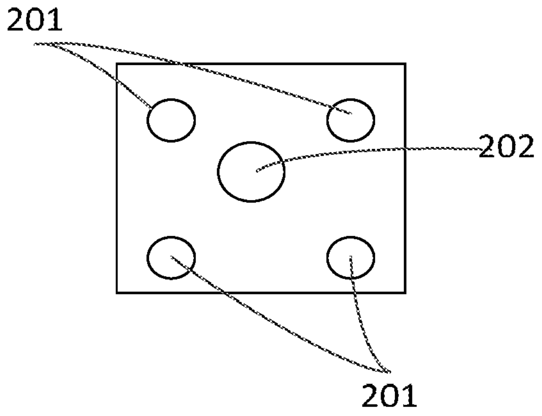
FIG. 4 is a schematic structural view of a transmitting unit and a receiving unit in a sensor module according to an example embodiment.

In addition, the plurality of transmitting units 201 are arranged adjacent to the receiving unit 202, which can reduce the size of the sensor module 200 and also convenient for the receiving unit 202 to receive the wireless signals transmitted by the transmitting unit 201. FIG. 4 is a schematic structural view of the transmitting unit and the receiving unit in the sensor module according to one example embodiment. There are four transmitting units 201 that are arranged around the receiving unit 202. Alternatively, in other embodiments, the transmitting unit 201 and the receiving unit can be arranged in other layout modes, such as in a row arrangement or in a column arrangement, etc., which is not specifically limited in the embodiment of the present disclosure.

Figure 5:
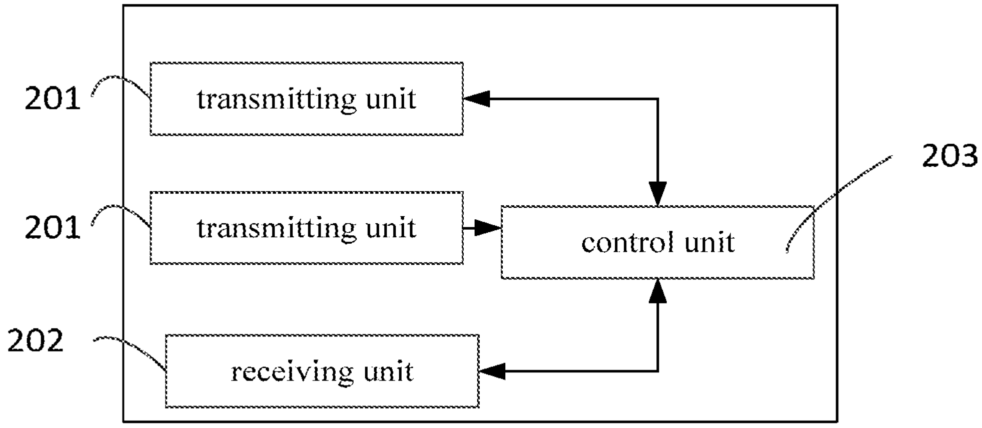
FIG. 5 is another block diagram of the display screen according to an example embodiment.

In addition, FIG. 5 is another block diagram of the display screen according to one example embodiment. The display screen can further include a control unit 203 connected to the respective transmitting units 201 and to the receiving unit 202. The control unit 203 can be respectively connected to the transmitting units and the receiving unit, and control the transmitting unit to transmit the wireless signals and also determine the sensed information, such as the distance information, and the identification information of the device, etc. according to the wireless signals received by the receiving unit 202. The control unit 203 of the embodiment of the present disclosure can be arranged on the driving layer, and also can be arranged in other positions, which will not be limited in the embodiment of the present disclosure.

In some embodiments, the control unit 203 can control each of the plurality of the transmitting units 201 to transmit wireless signals successively, and the time for each transmitting unit 201 to transmit the wireless signals is less than a time threshold. That is, the respective transmitting units 201 can transmit the wireless signals at different times, and only one transmitting unit is transmitting the wireless signal within a per time range. Such configuration can prevent occurrence of bright spots caused by emitting light due to that the light emitting elements or the light emitting materials in the light emitting layer are excited by the wireless signals transmitted by the transmitting units.

In a case that one emitting unit is arranged, because the emitting unit would continuously transmit the wireless signals for a long time, the light emitting elements or the light emitting materials at the corresponding position of the light emitting layer can be accordingly excited to emit light, thereby forming a bright spot at the position.

Therefore, some embodiments of the present disclosure can avoid the occurrence of the light spots generated in the light emitting layer in the case of the one single emitting unit, by using the plurality of emitting units to respectively transmit the wireless signals while limiting the time for transmission. That is, the time threshold can be determined as a minimum duration value that a single transmitting unit continuously transmits the wireless signal to excite the light emitting layer to generate the light spots, so that the time for each transmitting unit to transmit the wireless signal is less than the time threshold.

The time threshold can be set according to requirements, for example, being determined by a first time for transmitting the wireless signals when one transmitting unit is set. The time threshold can be a ratio of the first time to the number of transmitting units, or the times for the respective transmitting units to transmit the wireless signals can be different, but a sum of the times for the respective transmitting units to transmit the wireless signals is made to be the first time, so that occurrence of the bright spots on the display screen can be avoided under the circumstance that strength of the wireless signals can be ensured and the total transmitting time are constant.

In addition, in the embodiment of the present disclosure, the control unit 203 can control the respective transmitting units 201 to sequentially transmit the wireless signals according to the layout position, wherein the time for each transmitting unit 201 to transmit the wireless signal is less than the time threshold.

The control unit 203 in the embodiment of the present disclosure can store identifications of the respective transmitting units and set a time for each transmitting unit to transmit the wireless signal, so that the control unit 203 may accordingly start or turn off the respective transmitting units according to the set time.

In addition, in the embodiment of the present disclosure, the distances between the respective transmitting units 201 and the receiving unit 202 are equal to one another, and the strength of the wireless signals transmitted by each of the transmitting units are also identical to one another, so that it may be convenient to control the respective transmitting units. Moreover, the strength of the wireless signals transmitted by the respective transmitting units may be identical to the strength of the wireless signal transmitted by one transmitting unit as arranged, so that a phenomenon of the light spots generated in the light emitting layer may also be avoided efficiently without changing the strength of the signals of the sensor (ensuring normal use of the sensor) in the embodiment of the present disclosure.

Various embodiments of the disclosure can have one or more of the following advantages: beneath the light emitting layer of the OLED of the embodiment of the present disclosure, the sensor module for sensing corresponding information, for example, the distance sensor for detecting a distance, and the radio frequency sensor for sending or receiving radio frequency information and the like, can be arranged so that there is no need to arrange the sensor on the display screen, and further readily improve the screen proportion of the device and realize the full-screen design.

In addition, some embodiments of the disclosure further provide an electronic device, which can be employ the display screen. The display screen can be arranged on a first side of the electronic device, and the area of the display screen is equal to the area of the first side, that is, the full-screen design of the display screen on the first side can be achieved.

Figure 6:
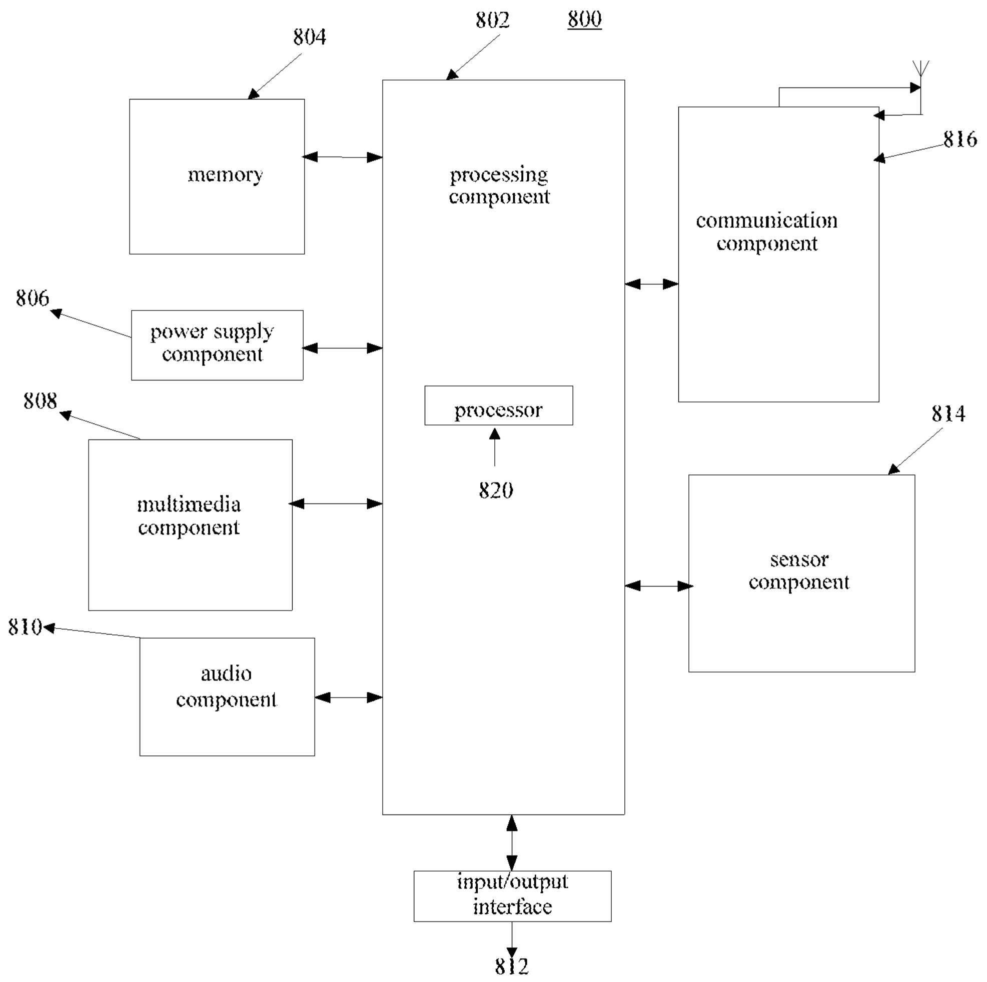
FIG. 6 is a block diagram of an electronic device according to an example embodiment.

FIG. 6 is a block diagram of an electronic device according to one example embodiment. For example, the electronic device 800 can be a computer, a digital broadcasting terminal, a messaging device, a game console, a tablet device, a medical device, a fitness device, a personal digital assistant, etc.

Referring to FIG. 6, the device 800 can include one or more components: a processing component 802, a memory 804, a power supply component 806, a multimedia component 808, an audio component 810, an input/output (I/O) interface 812, a sensor component 814, and a communication component 816.

The processing component 802 generally controls overall operations of the device 800, such as operations associated with displaying, telephone calling, data communication, camera operation, and recording operation. The processing component 802 can include one or more processors 820 for executing instructions to complete all or part of the steps of the above-described method. In addition, the processing component 802 can include one or more modules to facilitate for interaction between the processing component 802 and other components. For example, the processing component 802 can include a multimedia module to facilitate for interaction between the multimedia component 808 and the processing component 802.

The memory 804 is configured to store various types of data to support operations on the device 800. Examples of these data include instructions for operating any application or method on the device 800, contact data, phone book data, messages, pictures, videos, etc. The memory 804 can be implemented by any type of volatile or non-volatile storage devices or a combination of the volatile and the non-volatile storage devices, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 806 provides various components of device 800 with power. The power supply component 806 can include a power management system, one or more power supplies, and other components related to generating, managing, and distributing electric power for the device 800.

The multimedia component 808 includes a screen providing an output interface between the device 800 and the user. In some embodiments, the screen can include a liquid-crystal display (LCD) and a touch panel (TP). In some embodiments, other types of displays, such as OLED displays, can be adopted.

If the screen includes the touch panel, the screen can be implemented as a touch screen to receive an input signal from the user. The touch panel includes one or more touch sensors to sense gestures on the touch panel, such as touching and sliding. The touch sensor can not only sense a boundary of the touching or sliding actions, but also detect a duration and pressure related to the touching or sliding operation. In some embodiments, the multimedia component 808 includes a front-facing camera and/or a rear-facing camera. When the device 800 is in an operation mode, for example, in a shooting mode or in a video mode, the front-facing camera and/or the rear-facing camera can receive external multimedia data. Each of the front-facing camera and the rear-facing camera can be a fixed optical lens system or have a focal length and an optical zoom capability.

The audio component 810 is configured to output and/or input audio signals. For example, the audio component 810 includes a microphone (MIC), which is configured to receive external audio signals when the device 800 is in an operating mode, such as in a calling mode, in a recording mode, and in a speech recognition mode. The received audio signal can be further stored in the memory 804 or transmitted via the communication component 816. In some embodiments, the audio component 810 further includes a speaker for outputting the audio signals.

The I/O interface 812 provides an interface between the processing component 802 and a peripheral interface module. The peripheral interface can be a keyboard, a click wheel, and a button, etc. These buttons can include but not limit to a home button, a volume button, a starting button, and a locking button.

The sensor component 814 includes one or more sensors for providing the device 800 with status assessments of various aspects. For example, the sensor component 814 can detect the turn-on/off state of the device 800, a relative positioning of the components, such as a display and a keypad of the device 800. The sensor component 814 can also detect position variation of the device 800 or one component of the device 800, presence or absence of the user being in contact with the device 800, orientation or acceleration/deceleration of the device 800, and temperature variation of the device 800. The sensor component 814 can include a proximity sensor configured to detect the presence of nearby objects without any physical contact. The sensor component 814 can also include a light sensor, such as a CMOS or CCD image sensor, for use in imaging applications. In some embodiments, the sensor component 814 can further include an acceleration sensor, a gyroscope sensor, a magnetic sensor, a pressure sensor, or a temperature sensor.

The communication component 816 is configured to facilitate for communication between the device 800 and other devices in a wire or wireless manner. The device 800 can access to a wireless network (such as Wi-Fi, 2G, 3G, 4G, or 5G, or a combination thereof) based on a communication standard. In one example embodiment, the communication component 816 receives broadcasting signal or broadcasting-related information from an external broadcast management system via a broadcast channel. In one example embodiment, the communication component 816 further includes a near field communication (NFC) module to promote a short-range communication. For example, the NFC module can be implemented based on a radio frequency identification (RFID) technology, an infrared data association (IrDA) technology, an ultra-wideband (UWB) technology, a blue-tooth (BT) technology and other technologies.

In some embodiments, the device 800 can be implemented to perform the above-mentioned method by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic components.

Various embodiments of the present disclosure can have one or more of the following advantageous.

Underneath the light emitting layer of the display screen, the sensor module for sensing corresponding information, for example, the distance sensor for detecting a distance, and the radio frequency sensor for sending or receiving radio frequency information and the like, can be arranged such that there is no need to arrange the sensor on the display screen, and further readily realize the full-screen design of the device. In addition, a plurality of transmitting units can be provided such that a phenomenon of the light spots generated in the light emitting layer will be avoided by controlling the time of the respective transmitting units to transmit the wireless signals.

In some embodiments, there is also provided a computer-readable storage medium, which can be a non-transitory computer-readable storage medium having stored therein a computer program, when the stored computer program is executed by the processing component, the operation method of controlling the transmitting units or transmitters provided by the above embodiment of the present application can be implemented.

In some embodiments, there is also provided a computer program product, wherein at least one instruction, at least one program, a code set, or an instruction set is stored in the program product. The at least one instruction, the at least one program, the code set, or the instruction set instructions is loaded and executed by the processor to implement an operation method of controlling described above.

It should be understood that "a plurality" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects is an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on," a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

In the description of the present disclosure, the terms "some embodiments," "example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

Implementations of the subject matter and the operations described in this disclosure can be implemented with hardware such as digital electronic circuitry or processing circuits, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded or stored on one or more non-transitory computer-readable storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features can be described above as acting in certain combinations and even initially claimed as such, one or more features from a claimed combination can in some cases be excised from the combination, and the claimed combination can be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A display screen comprising:

a display module comprising a light emitting layer, and a driving layer configured to drive the light emitting layer to emit light; and a sensor module located beneath the display module or located beneath the light emitting layer in the display module;

wherein the sensor module comprises:

a plurality of transmitting units configured to transmit a wireless signal; and a receiving unit for receiving a reflected signal obtained from the wireless signal being reflected by a detected object and determining distance information between the sensor module and the detected object according to the received reflected signal;

wherein the display screen further comprises a control unit configured to control the transmitting unit to transmit the wireless signal;

wherein the control unit is further configured to control the plurality of transmitting units to transmit the wireless signal successively, and a time for each of the transmitting units to transmit the wireless signal is less than a time threshold; and wherein the time threshold is a minimum duration value that one of the transmitting units continuously transmits the wireless signal to excite the light emitting layer to generate light spots.

2. The display screen according to claim 1, wherein distances between each of the transmitting units and the receiving unit are equal to one another, and strength of the wireless signals transmitted by the transmitting units are identical to one another.

3. An electronic device comprising the display screen according to claim 2, wherein the display screen is arranged on a first side of the electronic device, and the area of the display screen being equal to the area of the first side.

4. The display screen according to claim 1, wherein the plurality of transmitting units are arranged around the receiving unit.

5. An electronic device comprising the display screen according to claim 4, wherein the display screen is arranged on a first side of the electronic device, and the area of the display screen being equal to the area of the first side.

6. The display screen according to claim 1, wherein the display module comprises a substrate, the driving layer and the light emitting layer are sequentially superimposed on the substrate, and the sensor module is embedded in the substrate.

7. An electronic device comprising the display screen according to claim 6, wherein the display screen is arranged on a first side of the electronic device, and the area of the display screen being equal to the area of the first side.

8. The display screen according to claim 1, wherein an insulating layer is provided between the driving layer and the light emitting layer, and the sensor module is embedded in the insulating layer.

9. An electronic device comprising the display screen according to claim 8, wherein the display screen is arranged on a first side of the electronic device, and the area of the display screen being equal to the area of the first side.

10. An electronic device comprising the display screen according to claim 1, wherein the display screen is arranged on a first side of the electronic device, and the area of the display screen is equal to the area of the first side.

11. A mobile phone comprising the display screen according to claim 1, wherein the display screen comprises one of an organic light-emitting diode (OLED) display or a liquid-crystal display (LCD);

distances between each of the transmitting units and the receiving unit are equal to one another, and strength of the wireless signals transmitted by the transmitting units are identical to one another;

the plurality of transmitting units are arranged around the receiving unit;

the display module comprises a substrate, the driving layer and the light emitting layer are sequentially superimposed on the substrate, and the sensor module is embedded in the substrate;

an insulating layer is provided between the driving layer and the light emitting layer; and the sensor module is embedded in the insulating layer.

12. The mobile phone of claim 11, wherein the sensor module comprises a distance sensor configured to detect a distance, and a radio frequency sensor configured to send or receive radio frequency information, and wherein the sensor module is arranged such that a full-screen display of the mobile phone is realized.

13. The mobile phone of claim 12, wherein the plurality of transmitting units are configured to avoid the light spots being generated in the light emitting layer by controlling the time for each of the plurality transmitting units to transmit the wireless signal.

* * * * *